United States Patent
Sakkinen et al.

(10) Patent No.: US 9,340,135 B2
(45) Date of Patent: May 17, 2016

(54) SEAT ASSEMBLY HAVING AN IMPACT LOAD TRANSFER STRUCTURE

(75) Inventors: Daniel James Sakkinen, Highland, MI (US); Nicholas Leonard Petouhoff, South Lyon, MI (US); Antoine A. Kmeid, Canton, MI (US); Todd W. Waelde, Livonia, MI (US); Eric B. Michalak, Northville, MN (US); Joseph F. Prosniewski, Brownstown Township, MI (US); Alexander I. Balin, Ann Arbor, MI (US); Ornela Zekavica, Novi, MI (US); Phillip Wayne Wilson, Wixom, MI (US); Alexander Saveski, South Lyon, MI (US)

(73) Assignee: Johnson Controls Technology Company, Holland, MI (US)

( * ) Notice: Subject to any disclaimer, the term of this patent is extended or adjusted under 35 U.S.C. 154(b) by 444 days.

(21) Appl. No.: 13/388,475

(22) PCT Filed: Aug. 4, 2010

(86) PCT No.: PCT/US2010/044417
§ 371 (c)(1),
(2), (4) Date: Apr. 18, 2012

(87) PCT Pub. No.: WO2011/017435
PCT Pub. Date: Feb. 10, 2011

(65) Prior Publication Data
US 2012/0193954 A1  Aug. 2, 2012

Related U.S. Application Data

(60) Provisional application No. 61/231,226, filed on Aug. 4, 2009.

(51) Int. Cl.
*B60N 2/68* (2006.01)
*B60N 2/42* (2006.01)

(52) U.S. Cl.
CPC ............ *B60N 2/68* (2013.01); *B60N 2/4235* (2013.01); *B60N 2/4249* (2013.01)

(58) Field of Classification Search
USPC ................. 297/216.13, 216.18, 452.18
See application file for complete search history.

(56) References Cited

U.S. PATENT DOCUMENTS 3,328,020 A    6/1967  Flint
4,076,306 A *  2/1978  Satzinger ............ 297/216.13
(Continued)

FOREIGN PATENT DOCUMENTS

JP    11-222088    2/1998
JP    2004-231060  1/2003
(Continued)

OTHER PUBLICATIONS

International Search Report, Application No. PCT/US2010/044417, dated: Sep. 22, 2010.
(Continued)

*Primary Examiner* — David R Dunn
*Assistant Examiner* — Timothy J Brindley
(74) *Attorney, Agent, or Firm* — Butzel Long (57) ABSTRACT

A seat back frame for use in a vehicle seat assembly including a first side member, a second side member, an upper cross member, and a lower cross member. The seat back frame also includes a load transfer member that transfers impact loads from a collision through the seat assembly.

5 Claims, 7 Drawing Sheets

(56) References Cited

U.S. PATENT DOCUMENTS

| | | | |
|---|---|---|---|
| 4,192,545 A * | 3/1980 | Higuchi et al. | 297/216.13 |
| 4,249,769 A * | 2/1981 | Barecki | 296/68.1 |
| 5,318,341 A * | 6/1994 | Griswold et al. | 297/362.11 |
| 5,447,360 A * | 9/1995 | Hewko et al. | 297/452.18 |
| 5,501,509 A | 3/1996 | Urrutia | |
| 5,564,785 A * | 10/1996 | Schultz et al. | 297/452.2 |
| 5,636,901 A * | 6/1997 | Grilliot et al. | 297/452.18 |
| 5,645,316 A * | 7/1997 | Aufrere et al. | 297/216.13 |
| 5,658,048 A * | 8/1997 | Nemoto | 297/410 |
| 5,775,780 A * | 7/1998 | Murphy et al. | 297/473 |
| 5,782,537 A * | 7/1998 | Leistra et al. | 297/473 |
| 5,971,490 A * | 10/1999 | Chang | 297/473 |
| 5,988,756 A * | 11/1999 | Aufrere et al. | 297/452.18 |
| 6,082,823 A * | 7/2000 | Aumont et al. | 297/452.2 |
| 6,106,066 A | 8/2000 | Moffa et al. | |
| 6,322,148 B1 * | 11/2001 | Kolena et al. | 297/452.2 |
| 6,412,863 B1 * | 7/2002 | Merrick et al. | 297/216.18 |
| 6,712,429 B2 * | 3/2004 | Villarroel | 297/361.1 |
| 8,132,862 B2 * | 3/2012 | Yamada et al. | 297/452.2 |
| 8,511,748 B2 * | 8/2013 | McLeod et al. | 297/216.1 |
| 8,523,284 B2 * | 9/2013 | Yamada et al. | 297/452.18 |
| 2002/0079725 A1 * | 6/2002 | Ruff et al. | 297/216.13 |
| 2003/0160482 A1 * | 8/2003 | Yanai | 297/216.13 |
| 2005/0231019 A1 * | 10/2005 | Gryp | 297/452.18 |
| 2007/0085397 A1 * | 4/2007 | Tanaka et al. | 297/354.12 |
| 2008/0203786 A1 * | 8/2008 | Niitsuma et al. | 297/216.13 |
| 2009/0261636 A1 * | 10/2009 | Jeong | 297/216.13 |

FOREIGN PATENT DOCUMENTS

| | | |
|---|---|---|
| JP | 2011-25827 | 7/2009 |
| WO | WO 2011017435 | 2/2011 |

OTHER PUBLICATIONS

First Office Action in China, Date of Issue: Jun. 5, 2013.
Translation of "Notice of Reasons for Rejection", (Office Action), date of delivery Mar. 25, 2014.
Patent Abstract of Japan Publication No. 2011-025827, date of publication of application: Feb. 10, 2011.
Patent Abstract of Japan Publication No. 11-222088, date of publication of application: Aug. 17, 1999.
Patent Abstract of Japan Publication No. 2004-231060, date of publication of application: Aug. 19, 2004.

* cited by examiner

SEAT ASSEMBLY HAVING AN IMPACT LOAD TRANSFER STRUCTURE

CROSS REFERENCE TO RELATED APPLICATIONS

This application claims the benefit of and priority to U.S. Provisional Application No. 61/231,226, filed Aug. 4, 2009, which is incorporated herein by reference.

BACKGROUND

The present disclosure relates generally to the field of seating for vehicles and more particularly, to side a impact load transfer structure for a vehicle seat.

DESCRIPTION OF THE RELATED ART

It is generally known to provide a vehicle seat having various safety features. Further, it is generally known to provide a vehicle seat mechanism for managing impact forces. For example, it is known to provide a seat belt for securing an occupant within a seat and an air bag that deploys upon vehicle impact to minimize or prevent injury to an occupant during a vehicle collision or accident. Known safety features, however, can include a number of disadvantages, such as, being costly, complex, and relatively massive, among other disadvantages. Known safety features also remain deficient because under certain circumstances they do not provide complete safety for occupants. Moreover, known safety features do not effectively transfer an impact force or load from a vehicle collision to better protect a vehicle occupant.

Accordingly, there remains a continuing need to provide an improved seat that provides greater safety for an occupant during a vehicle side impact collision, provides improved management of a load force from an impact collision, provides higher performance and at the same time has lower cost, lower mass, lower complexity, is relatively easy to manufacture, and has exceptional load carrying capabilities and occupant zone protection.

SUMMARY

Accordingly, the present disclosure relates to a seat back frame for use in a vehicle seat assembly including a first side member, a second side member, an upper cross member, and a lower cross member. The seat back frame also includes a load transfer member that transfers impact loads from a collision diagonally through the seat assembly.

An advantage of the present disclosure is that the seat assembly more effectively transfers an impact load from a vehicle collision through the seat and away from the occupant. Another advantage of the present disclosure is enhanced occupant safety. A further advantage of the present disclosure is that the seat assembly provides higher safety performance while reducing seat assembly costs.

Other features and advantages of the present disclosure will be readily appreciated, as the same becomes better understood after reading the subsequent description taken in conjunction with the accompanying drawings.

DESCRIPTION

Figure 1:
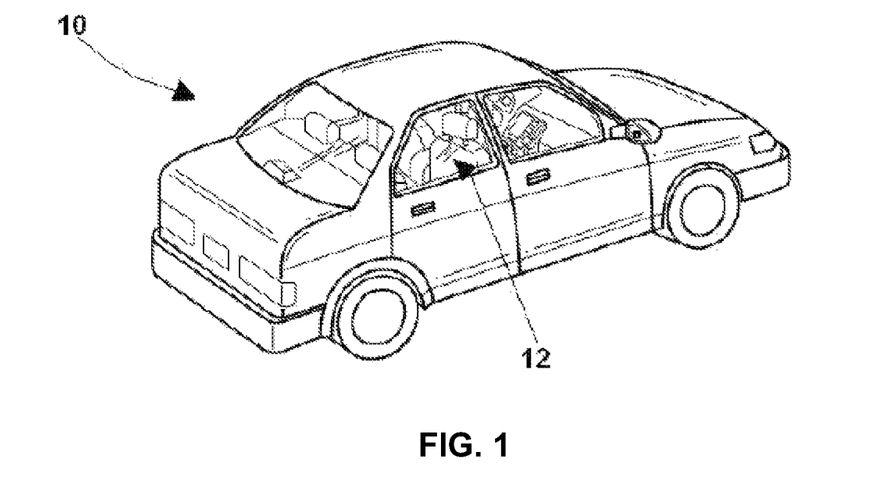
FIG. 1 is a perspective view of a vehicle, according to an exemplary embodiment.

Referring generally to the FIGURES and particularly to FIG. 1, a vehicle 10 is shown according to an exemplary embodiment. The vehicle 10 can include one or more seat assemblies 12 provided for occupant(s) of the vehicle 10. While the vehicle 10 shown is a four door sedan, it should be understood that the seat assembly 12 may be used in a minivan, sport utility vehicle, airplane, boat, or any other type of vehicle.

Figure 2:
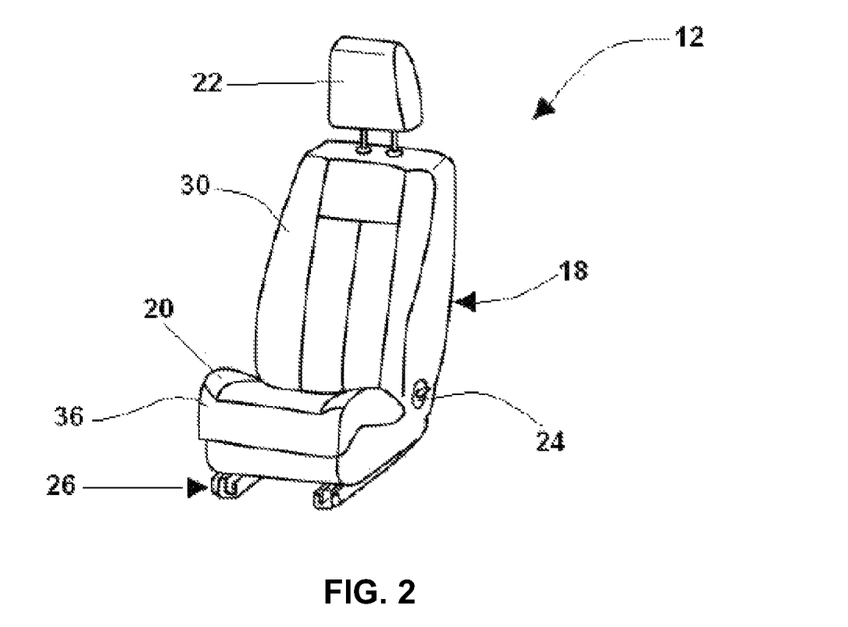
FIG. 2 is a perspective view of a seat assembly, according to an exemplary embodiment.

Referring now to FIG. 2, a seat assembly 12 is shown. The seat assembly 12 can include a seat back 18 to provide comfort, support and protection to the seated occupant. A seat cushion (base) 20 is operatively connected to the seat back, and likewise provides comfort, support and protection to the seated occupant. A head restraint 22 is positioned at an upper end of the seat back 18. The seat assembly 12 includes a recliner mechanism 24 operatively connected to the seat back and seat cushion, to provide rotatable adjustability of the seat back 18 with respect to the seat cushion 20. The seat assembly is secured to the vehicle using a track assembly 26. The track assembly of this example provides for adjustability or movement of the relative position of the seat assembly 12 for comfort or utility of the seated occupant. The seat back 18 can include, for example, a foam pad 28, a trim cover 30, and a one-piece seat back structure 32. The seat cushion 20 can include, for example, a foam pad 34, a trim cover 36, and a one-piece seat cushion structure 38. The seat assembly 12 illustrated is a one-occupant seat typically used in the front row of a vehicle, but a one-piece structure 5 may be incorporated into any seat assembly, such as, a second row bench, a third row fold flat seat, or the like, which may utilize any type of seat functionality for use within any vehicle.

Figure 3:
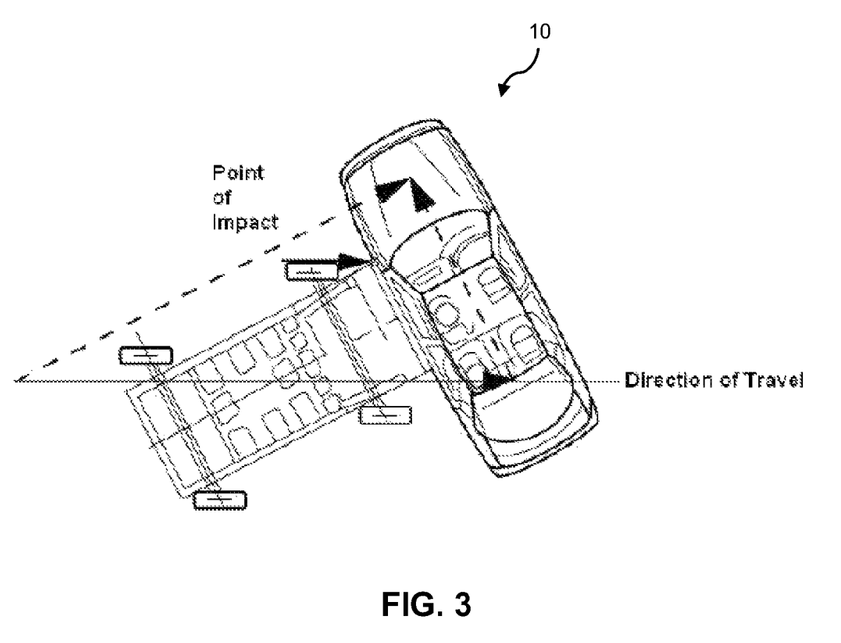
FIG. 3 is a diagram of a side impact collision between two vehicles, according to an exemplary embodiment.
Figure 4:
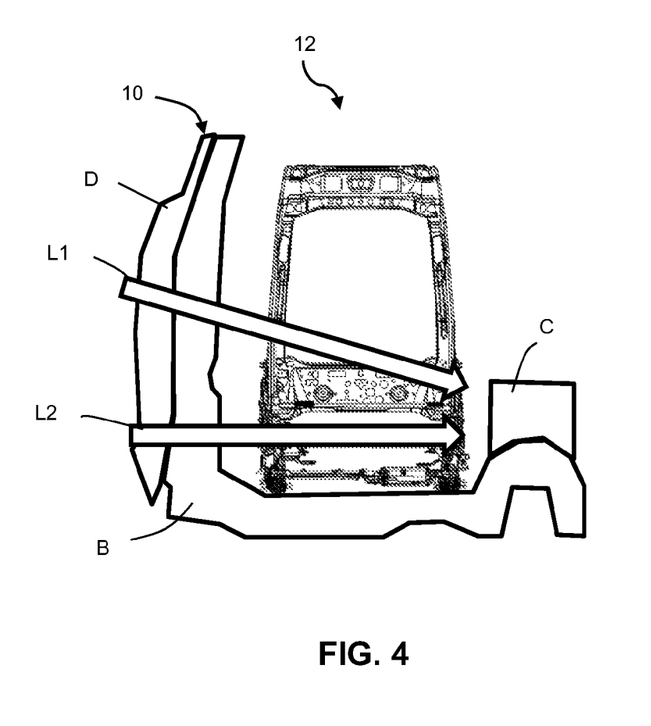
FIG. 4 is a partial front view of a vehicle interior having a vehicle seat assembly showing the impact forces from a side impact collision, according to an exemplary embodiment.

Referring now to FIGS. 3 and 4, a diagram of a side impact collision between the vehicle and an object such as another vehicle, or the like, and a vehicle seat frame assembly 12 within a vehicle interior depicting an impact forces from a side impact collision are shown, respectively. More specifically, FIG. 3 shows the point of impact of a moving vehicle impacting the side of a stationary vehicle. The number, magnitude, direction of impact loads/forces may vary depending on a variety of variables/factors, such as, the impact velocity between the vehicle and another object(s), the location of the impact on the vehicle, the direction of impact, or the like. For example, a collision can result in one or several load paths having different directions and magnitude. In this example, the side impact creates a first load path (L1) generally directed diagonally downward through the vehicle door (D) and body (B) towards the center of the vehicle and the center console (C) and a second load path (L2) generally directed horizontally through the vehicle door (D) and body (B) towards the center of the vehicle and the center console (C), as shown in FIG. 4. These impact forces or loads can cause significant damage to the vehicle 10 and severe injury to occupants if left unchecked or unmitigated. The load transfer structure or member 74 of the present disclosure aids in transferring one or more loads or impact forces from a vehicle impact collision to better protect a vehicle occupant. More specifically, the load transfer structure 74 strengthens the seat frame 24 in the direction of the load path to transfer the crash load through the seat assembly and into the center console (C) and/or the center vehicle body (B).

Figure 5:
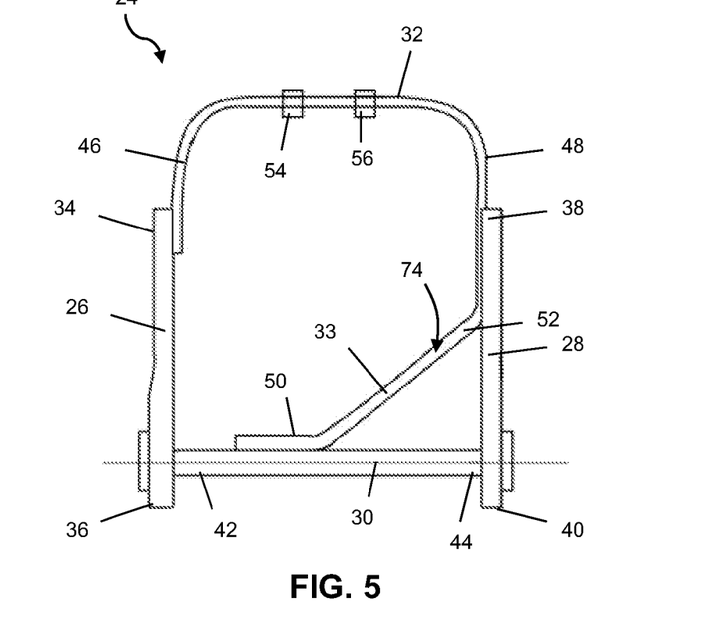
FIG. 5 is a front view of a seat back frame having a load transfer structure, according to an exemplary embodiment.
Figure 6:
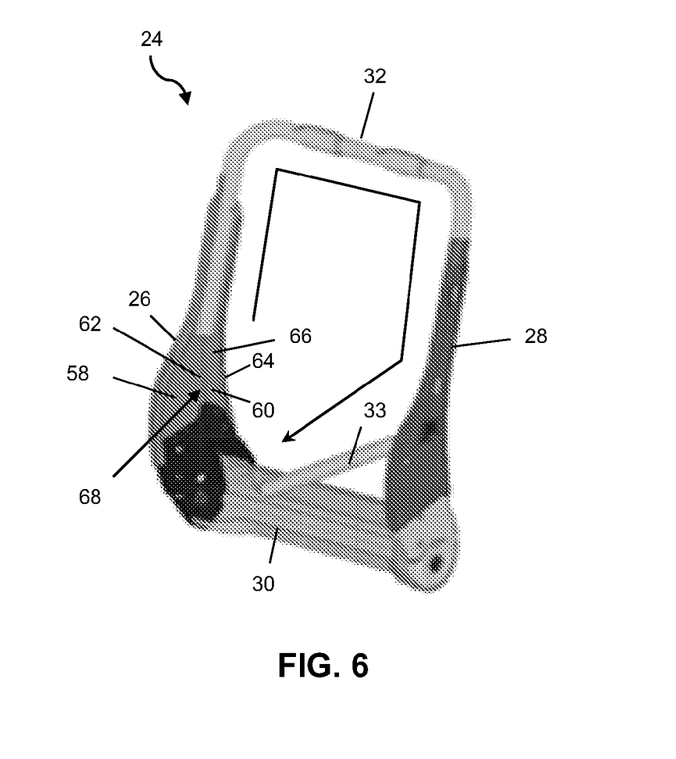
FIG. 6 is a front perspective view of a seat back frame having a load transfer structure, according to another embodiment.

Referring now to FIGS. 5 and 6, a seat back frame 24 having a load transfer structure or member 74 of the present disclosure is shown. The seat back frame 24 includes a first side member 26, a second side member 28, a lower cross member 30, an upper cross member 32, and a middle cross member 33. The first side member 26 includes a first end (upper end) 34 and a second end (lower end) 36, and the second side member 28 includes a first end (upper end) 38 and a second end (lower end) 40. The first and second side members 26, 28 are positioned generally parallel to one another and are spaced apart at a predetermined distance. The lower cross member 30 includes a first and second end 42, 44 and is positioned generally perpendicularly between the first and second side member 26, 28, such that the first end of the lower cross member 42 is coupled to the second end of the first side member 36 and the second end of the lower cross member 44 is coupled to the second end of the second side member 40. The upper cross member 46 is positioned generally perpendicularly between the first and second side members 26, 28, such that the first end of the upper cross member 46 is coupled to the first end of the first side member 34 and the second end of the upper cross member 48 is coupled to the first end of the second side member 40. The middle cross member 33 includes a first end 50 and second end 52 and generally extends diagonally between the middle portion of the second side member 28 and the middle portion of the lower cross member 30, such that the second end of the middle cross member 52 is coupled to the middle portion of the second side member 28 and the first end of the middle cross member 50 is coupled to the middle portion of the lower cross member 30. The seat back frame 24 can also include a first and second bracket member 54, 56 coupled to the upper cross member 32 to couple other seat structures thereto, such as, a head restraint 18. The diagonally positioned middle cross member 33 acts as a load transfer structure or member 74 that effectively transfers an impact load from a diagonal load path through or around the seat assembly 12. In this example, the middle cross member 33 is integral with the upper cross member 32 and forms a single unitary body. The position and direction of the middle cross member 33 can vary depending upon various requirements, needs, and criteria. Generally, the middle cross member 33 extends away from the outboard side of the seat frame 24 (adjacent the door side of the vehicle) to the inboard side of the seat frame 24 towards the center of the vehicle. Therefore, the middle cross member 33 extends from the second side member 28 downward towards the lower cross member 30 for a driver side seat assembly 12, as shown in FIG. 5. For a passenger side assembly 12, the middle cross member 33 extends from the first side member 26 downward towards the lower cross member 30.

The members can also include side walls extending from their surfaces, channels/grooves for attachment and overlapping other members, apertures, attachment surfaces, flanges, extensions, or the like. In this example, the first and second side members 26, 28 include a first (outer) side wall 58 generally extending perpendicularly from the first (front) surface 60 at an outer edge 62 and a second (inner) side wall 64 generally extending perpendicularly from the first (front) surface 60 at an inner edge 66 to form a generally U-shaped channel 68.

It should be noted that the members of the seat back frame 24 can have various geometries, sizes, shapes, or the like. For example, the members can be stamped generally planar members, tubular members, or the like, and have predetermined cross-sectional profiles, such as, rectangular, circular, oval, irregular, U-shaped, or the like. In this example, the upper cross member 32 and the middle cross member 33 have a tubular cross-sectional profile. Moreover, the surfaces of the members may have additional features that strengthen the members and facilitate load transferring, such as, corrugations/convolutions, dimples, ribs, apertures, or the like.

It should also be noted that the middle cross member 33 can also be positioned in other configurations, such as, for example, the opposite direction such that the middle cross member 33 is coupled to and extends downward from the first side member 26, or the like. It is also noted that a second middle cross member 33 could be included such that there is a diagonal middle cross member 33 extending diagonally from each side member 26, 28 in opposite directions.

The components of the seat back frame 24 can be made from a variety of materials, such as, metal, alloys, high strength steel (HSS), or the like, and can be processed using a variety of processes, such as, heat treatment, or the like. The components of the seat back frame 24 can also be coupled together using a variety of techniques, such as, welding, laser welding, fastening, bolting, or the like. The seat back frame 24 can also be coupled to other load transfer structures, devices, or mechanisms 74, as described throughout the present disclosure.

Figure 7:
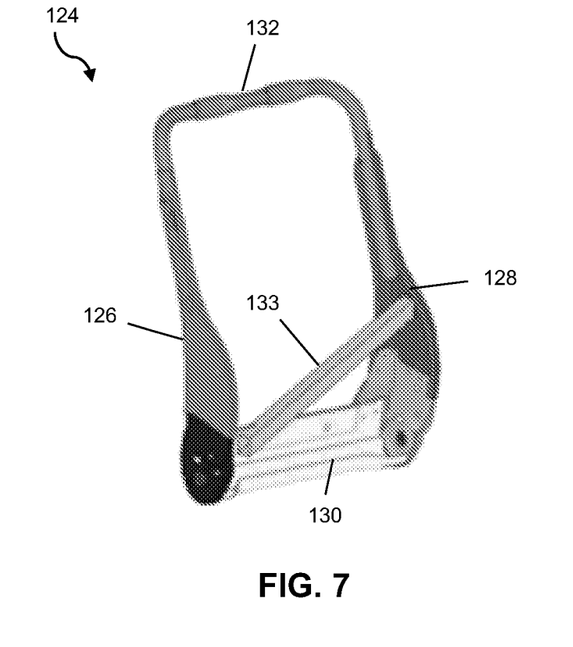
FIG. 7 is a front perspective view of a seat back frame having a load transfer structure, according to still another embodiment.

Referring now to FIG. 7, another embodiment of a seat back frame having a load transfer structure 174 is shown. In this embodiment, the seat back frame 124 is similar to the seat back frame of FIG. 5, wherein like features are represented by like reference numbers. The seat back frame 124 includes a middle cross member 133 that is not integral with the upper cross member 132. The middle cross member 133 has a tubular and rectangular cross-sectional profile. This enables the incorporation of a middle cross member 133 having a different cross-sectional profile than the upper cross member 132. In this example, the middle cross member 133 has a rectangular cross-sectional profile and acts as the load transfer structure 174.

Figure 8:
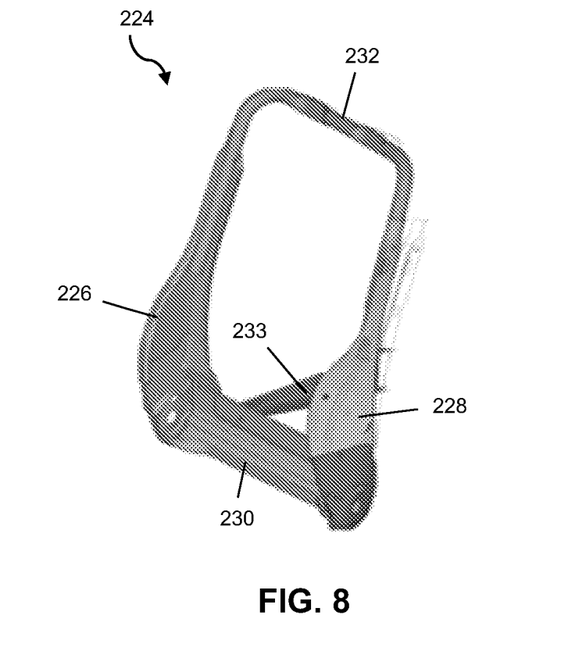
FIG. 8 is a front perspective view of a seat back frame having a load transfer structure, according to still another embodiment.

Referring now to FIG. 8, still another embodiment of a seat back frame 224 having a load transfer structure 274 is shown. In this embodiment, the seat back frame 224 is similar to the seat back frame of FIG. 5, wherein like features are represented by like reference numbers. The seat back frame 224 includes a middle cross member 233 that is not integral with the upper cross member 132. The middle cross member 233 is generally an elongated planar member. This enables the incorporation of a middle cross member 233 having a different cross-sectional profile than the upper cross member 232. In this example, the middle cross member 233 has a flat cross-sectional profile and acts as the load transfer structure 274. The middle cross member 233 may be coupled to the inside of the side member 228 (e.g., front surface, etc.) and lower cross member 233, the outside of the side member 228 (e.g., rear surface, etc.) and lower cross member 233, or a combination thereof.

Figures 9A, 9D:
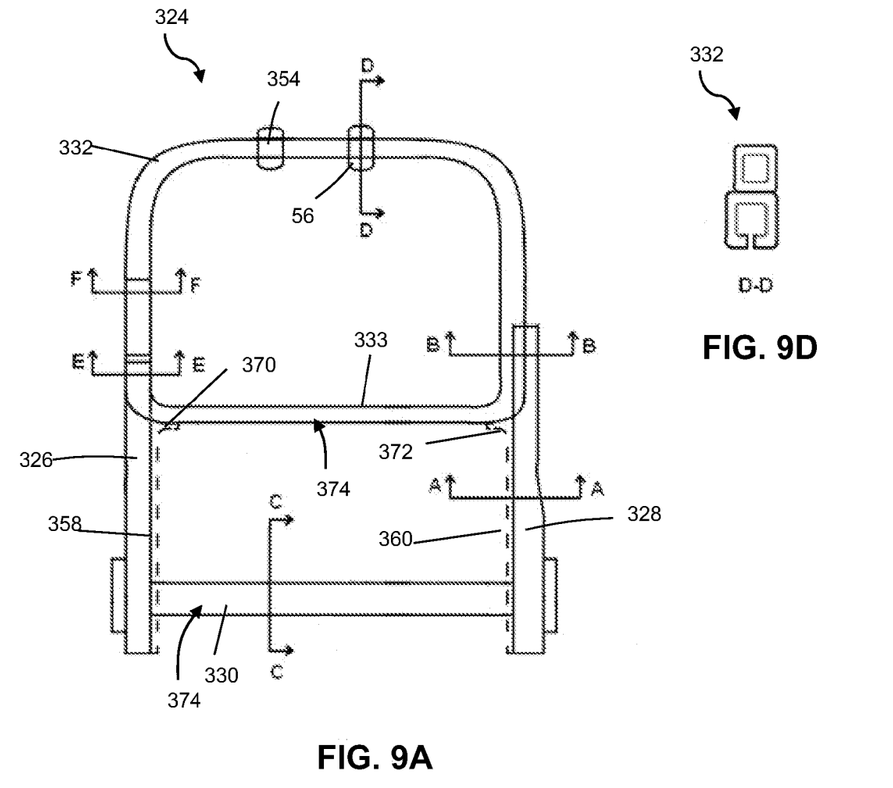
FIG. 9A is a front view of a seat back frame having a load transfer structure, according to an exemplary embodiment.
FIG. 9D is a cross-sectional view of the seat back frame having a load transfer structure of FIG. 9A along the D-D line.
Figure 9B:
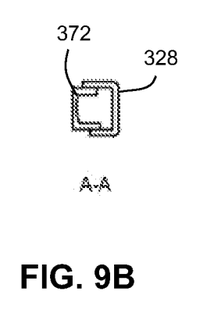
FIG. 9B is a cross-sectional view of the seat back frame having a load transfer structure of FIG. 9A along the A-A line.
Figure 9C:
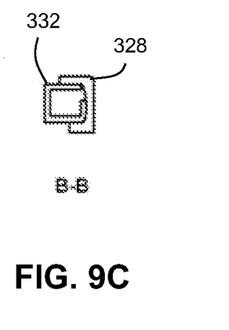
FIG. 9C is a cross-sectional view of the seat back frame having a load transfer structure of FIG. 9A along the B-B line.
Figure 9E:
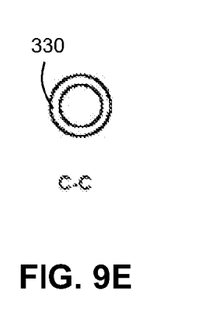
FIG. 9E is a cross-sectional view of the seat back frame having a load transfer structure of FIG. 9A along the C-C line.
Figure 9F:
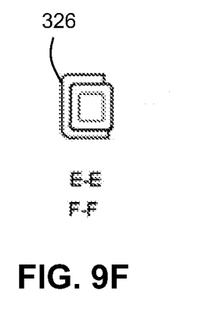
FIG. 9F is a cross-sectional view of the seat back frame having a load transfer structure of FIG. 9A along the E-E and F-F line.

Referring now to FIGS. 9A-9F, still another embodiment of a seat back frame 324 having a load transfer structure 374 is shown. The seat back frame 324 includes a first side member 326, a second side member 328, a lower cross member 330, an upper cross member 332, and a middle cross member 333, as shown in FIG. 9A. These members are generally hollow tubes having a predetermined cross-sectional profile, such as, rectangular, circular, U-shaped, or the like. The first side member 326 includes a first end (upper end) 334 and a second end (lower end) 336, and the second side member 328 includes a first end (upper end) 338 and a second end (lower end) 340. The first and second side members 326, 328 are positioned generally parallel to one another and are spaced apart at a predetermined distance. The first and second side members 326, 328 have a generally rectangular cross-section in which their first ends 334, 338 have a cross-section that is generally U-shaped for attachment to the upper cross member 332, as shown in FIGS. 9B, 9C, 9F. The lower cross member 330 includes a first and second end 342, 344 and is positioned generally perpendicularly between the first and second side member 326, 328, such that the first end of the lower cross member 342 is coupled to the second end of the first side member 336 and the second end of the lower cross member 344 is coupled to the second end of the second side member 340. The lower cross member 330 has a generally circular cross-section, as shown in FIG. 9E. The upper cross member 332 includes a first end 346 and a second end 348 and a generally rectangular cross-section, as shown in FIG. 9D. The upper cross member 346 is positioned generally perpendicularly between the first and second side members 326, 328, such that the first end of the upper cross member 346 is coupled to the first end of the first side member 334 and the second end of the upper cross member 348 is coupled to the first end of the second side member 340. The middle cross member 333 includes a first end 350 and second end 352 and is positioned perpendicularly between the middle portion of the first and second side member 326, 328, wherein the first end of the middle cross member 350 is coupled to the middle portion of the first side member 326 and the second end of the middle cross member 352 is coupled to the middle portion of the second side member 328. The middle cross member 333 has a generally rectangular cross-section. The seat back frame 324 can also include a first and second bracket member 354, 356 coupled to the upper cross member 332 to couple other seat structures thereto, such as, a head restraint 318. The first and second side members 326, 328 can also include a first and second reinforcement member 358, 360 coupled thereto. The first and second reinforcement member 358, 360 each have a first end (upper end) 362, 366 and a second end (lower end) 364, 368. The first end of the first and second reinforcement members 362, 366 also includes an extension 370, 372 for supporting at least a portion of the middle cross member 333.

The components of the seat back frame 324 can be made from a variety of materials, such as, metal, alloys, high strength steel (HSS), or the like, and can be processed using a variety of processes, such as, heat treatment, or the like. The components of the seat back frame 324 can also be coupled together using a variety of techniques, such as, welding, laser welding, fastening, bolting, or the like. In this example, the lower cross member (side load tube) 330, the upper cross member 332, and the middle cross tube 33 act as load transfer structures 374 that effectively transfer the loads from a vehicle collision impact. The seat back frame 324 can also be coupled to other load transfer structures, devices, or mechanisms 374, as described throughout the present disclosure.

Figures 10A, 10B:
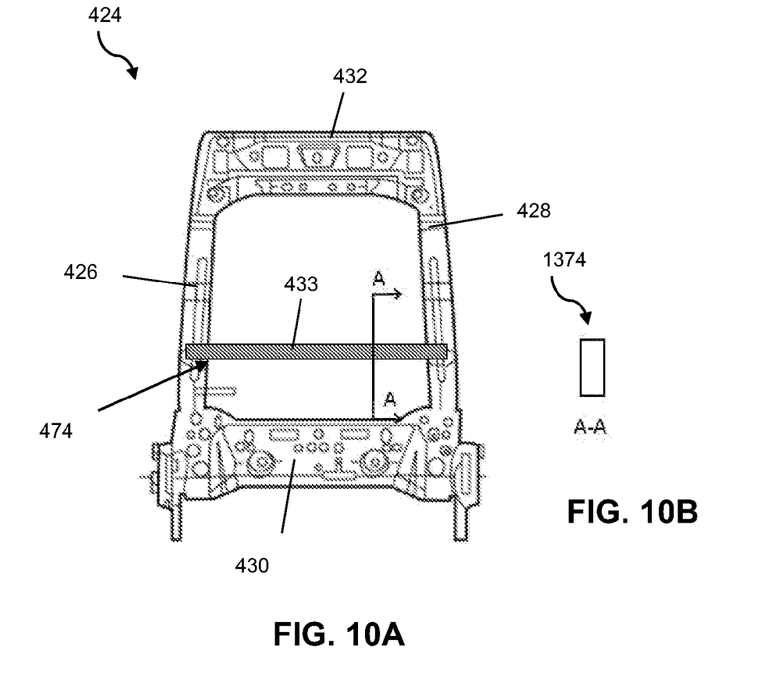
FIG. 10A is a front view of a seat back frame having a load transfer structure, according to still another embodiment.
FIG. 10B is a cross-sectional view of the seat back frame of FIG. 10A along the A-A line.
Figure 11:
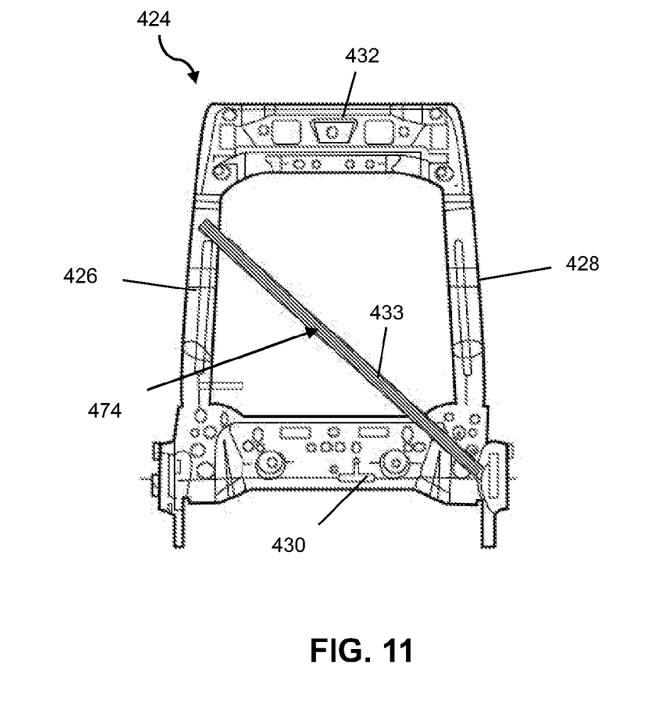
FIG. 11 is a front view of a seat back frame having a load transfer structure, according to still another embodiment.
Figure 12:
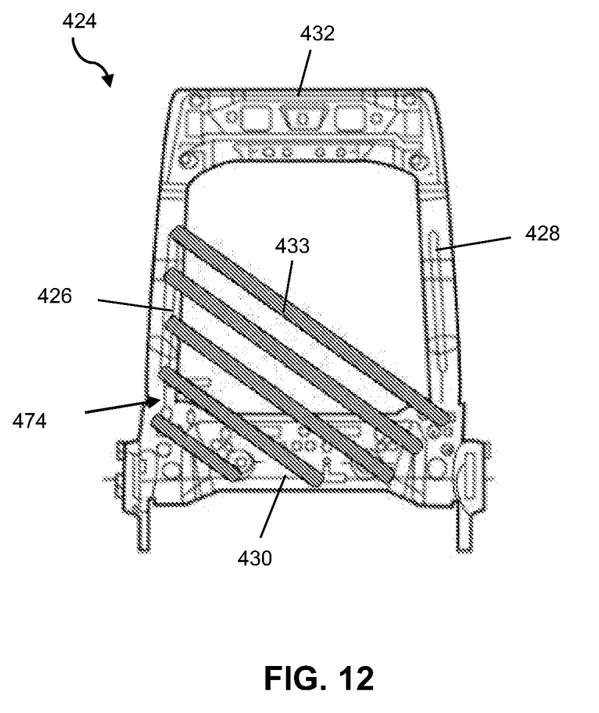
FIG. 12 is a front view of a seat back frame having a load transfer structure, according to still another embodiment.

Referring now to FIGS. 10A-10B, still another embodiment of a seat back frame 424 having a load transfer structure or member 474 is shown. In this embodiment, the load transfer structure 474 is a reinforcement member having predetermined characteristics, such as, shape, size, material type, thickness, or the like. In this example, the load transfer structure 474 is generally an elongated member having a rectangular tubular cross-section (as shown in FIG. 10B) having a first and second end 476, 478. The load transfer structure 474 is coupled to the seat back frame 424 such that the first end 476 is adjacent the first side member 426 and the second end 478 is adjacent the second side member 428. More specifically, the load transfer structure 474 is generally positioned in the middle portion of the seat back 424 between the first and second side members 426, 428 of the seat back frame 424 to selectively reinforce the seat back frame 424 and effectively transfer the load from a vehicle side impact collision. Alternatively, the load transfer structure 474 can be positioned diagonally between the first and second side members 426, 428 of the seat back frame 424, as shown in FIG. 11. According to yet another alternative, a plurality of load transfer structures 474 can be positioned diagonally between the first and second side members 426, 428 of the seat back frame 424, as shown in FIG. 12.

It is important to note that the construction and arrangement of the load transfer structure, device and mechanism as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Many modifications and variations of the present disclosure are possible in light of the above teachings. Therefore, within the scope of the appended claim, the present disclosure may be practiced other than as specifically described.

What is claimed is:

1. A seat back frame for use in a vehicle seat assembly, the seat back frame comprising:

a first side member having a first end, a second end, an inner surface, and an outer surface, and a second side member having a first end, a second end, an inner surface, and an outer surface, the first side member and the second side member spaced apart from one another;

a single unitary body defining an upper cross member portion and a load transfer member portion;

the upper cross member portion having a tubular cross-sectional profile, and having a first end coupled to the first end of the first side member and a section coupled to the first end of the second side member;

a lower cross member having a first end and is second end, the first end coupled to the second end of the first side member and the second end coupled to the second end of the second side member; and the load transfer member portion extending diagonally between a middle of the second side member and a middle of the lower cross member and having an end coupled to the lower cross member such that the load transfer member portion extends diagonally downward to the lower cross member, wherein the load transfer member portion transfers a load from an impact through the seat assembly.

2. The seat back frame of claim 1, wherein the lower cross member and the load transfer member portion are tubular.

3. The seat back frame of claim 2, wherein the upper cross member, the lower cross member, and the load transfer member pardon have one of a rectangular, circular, and oval cross-section.

4. The seat back frame of claim 1, wherein the upper cross member and the load transfer member portion are tubular and have a rectangular cross-section.

5. The seat back frame of claim 1, wherein the lower cross member is tubular and has a circular cross-section.

* * * * *